(12) United States Patent
Klawitter et al.

(10) Patent No.: US 11,308,808 B2
(45) Date of Patent: Apr. 19, 2022

(54) RISK REDUCTION IN ROAD TRAFFIC

(71) Applicant: Volkswagen Aktiengesellschaft, Wolfsburg (DE)

(72) Inventors: Matthias Klawitter, Braunschweig (DE); Daniel Münning, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 42 days.

(21) Appl. No.: 16/880,215

(22) Filed: May 21, 2020

(65) Prior Publication Data

US 2020/0372800 A1 Nov. 26, 2020

(30) Foreign Application Priority Data

May 22, 2019 (DE) ..................... 10 2019 207 518.5

(51) Int. Cl.
*G08G 1/123* (2006.01)
*G08G 1/16* (2006.01)
(Continued)

(52) U.S. Cl.
CPC ........... *G08G 1/166* (2013.01); *G08G 1/0112* (2013.01); *G08G 1/164* (2013.01); *H04W 4/44* (2018.02)

(58) Field of Classification Search
CPC ...... G08G 1/166; G08G 1/0112; G08G 1/164; G08G 1/163; G08G 1/096844; G08G 1/096827; G08G 1/096716; G08G 1/096775; G08G 1/096791; G08G 1/096725; G08G 1/0965; G08G 1/0141; G08G 1/0129; G08G 1/0133; G08G 1/0125; G08G 1/0137; G08G 1/161; H04W 4/44; H04W 4/90; H04W 4/027; H04W 4/029; H04W 4/02; H04W 4/024; H04W 4/40;
(Continued)

(56) References Cited

U.S. PATENT DOCUMENTS 6,084,510 A     7/2000   Lemelson et al. ........ 340/539.13
6,150,961 A * 11/2000   Alewine ................... G08G 1/01
                                                   701/119
(Continued)

FOREIGN PATENT DOCUMENTS

| DE | 10257842 A1 | 11/2003 | ............. G01S 13/93 |
| DE | 102014222524 A1 | 5/2016 | ........... G08G 1/0962 |
| WO | 2014/151793 A2 | 9/2014 | ................ B60Q 9/00 |

OTHER PUBLICATIONS

German Office Action, Application No. 102019207518.5, 7 pages, dated Feb. 10, 2020.

*Primary Examiner* — Toan N Pham
(74) *Attorney, Agent, or Firm* — Slayden Grubert Beard PLLC

(57) ABSTRACT

In a method for reducing risks in road traffic, using a motor vehicle an information signal is generated and transmitted to an analysis unit. The information signal contains a position of the corresponding motor vehicle and an associated hazard level. Using the analysis unit, the position is assigned to a route section and a risk characteristic value is determined as a function of the hazard level. Using the analysis unit, a risk signal is generated based on the risk characteristic value and provided to at least one traffic participant.

20 Claims, 2 Drawing Sheets

(51) Int. Cl.
*H04W 4/44* (2018.01)
*G08G 1/01* (2006.01)

(58) Field of Classification Search
CPC ............ G01C 21/3461; G01C 21/3415; G05D 2201/0213; G05D 1/0289; B60W 30/09; B60T 2201/12; B60Q 9/008
See application file for complete search history.

(56) References Cited

U.S. PATENT DOCUMENTS

| | | | |
|---|---|---|---|
| 6,862,524 B1 * | 3/2005 | Nagda | G08G 1/096816 340/995.13 |
| 7,617,048 B2 | 11/2009 | Simon et al. | 701/301 |
| 8,706,456 B2 * | 4/2014 | Mather | B01J 19/002 703/6 |
| 2009/0009357 A1 | 1/2009 | Heen et al. | 340/6.1 |
| 2016/0189306 A1 | 6/2016 | Bogovich et al. | 705/4 |
| 2016/0232790 A1 | 8/2016 | Massey et al. | 701/23 |
| 2017/0234691 A1 * | 8/2017 | Abramson | G01C 21/3484 701/442 |
| 2018/0208195 A1 * | 7/2018 | Hutcheson | G05D 1/0088 |
| 2019/0071072 A1 | 3/2019 | Seo | |

* cited by examiner

RISK REDUCTION IN ROAD TRAFFIC

CROSS-REFERENCE TO RELATED APPLICATIONS

This application claims priority to German Patent Application No. DE 10 2019 207 518.5, filed on May 22, 2019 with the German Patent and Trademark Office. The contents of the aforesaid Patent Application are incorporated herein for all purposes.

TECHNICAL FIELD

The invention relates to a method for reducing risks in road traffic and to a corresponding system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern motor vehicles often have driver assistance systems or other electronic vehicle guidance systems, for example emergency brake assistants or systems for autonomous driving. Accordingly, a motor vehicle of this kind also has sensor systems that can analyze the area around the vehicle. It is known that various motor vehicles can exchange data with one another for example by means of "car-to-car" communication or the like. Accordingly, motor vehicles can also exchange data with infrastructure apparatuses by means of "car-to-X" communication.

However, the vehicle guidance systems of the motor vehicles have a limited detection or effective range, and therefore critical situations in the road traffic may be detected relatively late. Document US 2016/0189306 A1 describes a method for lessening the risks associated with driving, in which risk values are assigned to road sections and said risk values are used to select less risky travel routes. This is intended to be used to set insurance tariffs. Various types of information, including accident information, geographic information and vehicle information, are received from one or more data sources and a risk value is calculated for associated road segments. The vehicle information may for example be related to accidents at a specific location. A computing device calculates a risk value for a road segment based on the information by applying actuarial methods to the information. This is intended to be used to determine insurance premiums for the driver of the vehicle sending the information.

Document DE 10 2014 222 524 A1 describes a method for reducing the hazard of accidents caused by ghost drivers. An item of hazard information, which includes an item of location information, as well as an item of information relating to the position of a vehicle are received by a server. If the hazard is relevant to the vehicle, an item of warning information is transmitted from the server to the vehicle. The item of hazard information may be generated by an infrastructure apparatus or by another vehicle. The item of hazard information may contain information relating to the type of hazard.

Document DE 102 57 842 A1 describes a method for determining a hazard of an accident between a first object and a second object. For this purpose, the state of the objects is determined and, in particular, a probability of danger and a probability of a collision between the first and second object.

SUMMARY

An object of the present invention is to provide an improved concept for reducing risks in road traffic by means of which general safety in road traffic can be further increased.

This object is solved by a method and a system for reducing risks according to the independent claims. Embodiments of the invention are discussed in the dependent claims and the following description.

According to a first exemplary aspect, a method for reducing risks in road traffic is provided. The method comprises:

using each of two or more motor vehicles, generating and transmitting an information signal to an analysis unit; wherein each information signal contains a position of the corresponding motor vehicle and an associated hazard level;

using the analysis unit, assigning each position to one of a plurality of route sections and determining a risk characteristic value for each of the route sections as a function of the hazard level;

using the analysis unit, generating a risk signal based on at least one risk characteristic value and providing the risk signal to at least one traffic participant; wherein the hazard level is assigned to a corresponding route section depending on the associated position, and the risk characteristic value is determined for the corresponding route section as a function of the hazard level assigned thereto; and using the analysis unit, statistically evaluating the hazard level assigned to the corresponding route section in order to determine the risk characteristic value for the corresponding route section.

According to another exemplary aspect, a system for reducing risks in road traffic is provided. The system comprises a communication interface, which is configured to receive at least one information signal from two or more motor vehicles and to transmit said at least one information signal to an analysis unit of the system;

said at least one information signal comprises a position of the corresponding motor vehicle and an associated hazard level;

the analysis unit is configured:

to assign the position to one of a plurality of route sections and to determine a risk characteristic value for each of the route sections as a function of the hazard level; and to generate a risk signal based on the risk characteristic value;

the communication interface is configured to transmit the risk signal to at least one traffic participant; and the analysis unit is configured:

to assign the hazard level to a corresponding route section depending on the associated position;

to determine the risk characteristic value for the corresponding route section as a function of the hazard level assigned thereto; and to statistically evaluate the hazard level assigned to the corresponding route section in order to determine the risk characteristic value for the corresponding route section.

The details of one or more embodiments are set forth in the accompanying drawings and the description below. Other features will be apparent from the description, drawings, and from the claims.

DETAILED DESCRIPTION

Figure 1:
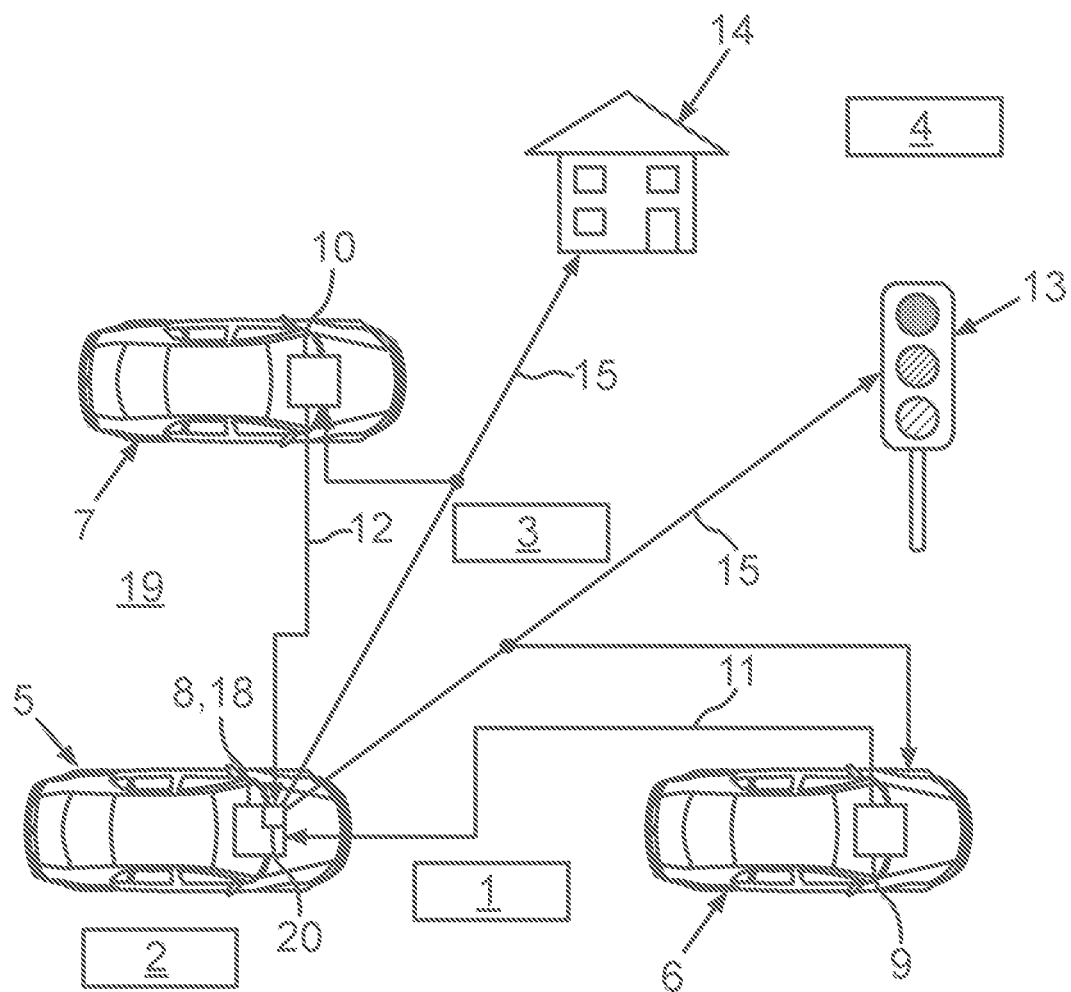
FIG. 1 shows a schematic representation of an exemplary embodiment of a method for reducing risks.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first independent exemplary aspect, a method is presented for reducing risks in road traffic. This involves at least one motor vehicle generating at least one information signal and transmitting same to an analysis unit. The at least one information signal contains a position of the corresponding motor vehicle and an associated hazard level. By means of the analysis unit, the positions are assigned to one of a plurality of route sections and a risk characteristic value is determined for the route section as a function of the hazard level. By means of the analysis unit, a risk signal is generated based on the risk characteristic value and provided to at least one traffic participant.

In some embodiments, two or more motor vehicles are present. A relevant information signal is generated and transmitted to the analysis unit by means of each of the motor vehicles. Each of the information signals contains a relevant position of the corresponding motor vehicle and an associated hazard level. By means of the analysis unit, each of the positions are assigned to one of a plurality of route sections and a relevant risk characteristic value is determined for each of the route sections as a function of the hazard levels. By means of the analysis unit, the risk signal is generated based on the risk characteristic values and provided to the at least one traffic participant.

The analysis unit may in some embodiments be part of a system for reducing risks in road traffic which comprises, in addition to the analysis unit, which for example comprises a computer or computing unit, a communication interface for receiving the information signals and for transmitting the risk signal.

The analysis unit may in some embodiments be part of a server, for example a back end server, or part of an infrastructure apparatus, one of the motor vehicles or another vehicle participant.

The position of the corresponding motor vehicle may in some embodiments correspond to a current position at a point in time at which the relevant information signal is generated and transmitted to the analysis unit.

In order to assign the positions to one of a plurality of route sections, the analysis unit for example determines in which of the route sections the position is located and then assigns the position to this route section.

The route sections may in some embodiments be parts of a road traffic network, such as contiguous road sections within the road traffic network.

The associated hazard level may in some embodiments be an individual characteristic value from the perspective of the relevant motor vehicle. For example, an electronic vehicle guidance system of the motor vehicle may determine the hazard level for example on the basis of sensor measurement values or other information.

The hazard level may in some embodiments be selected from a plurality of predefined hazard levels. The predefined hazard levels may for example include a minimum hazard level, the minimum hazard level corresponding to a situation in which the electronic vehicle guidance system of the relevant motor vehicle has detected no hazard, i.e., in particular no actually present, impending or potential critical situation.

The predefined hazard levels may in some embodiments also include a maximum hazard level, which for example corresponds to a situation in which the electronic vehicle guidance system of the relevant motor vehicle has for example detected the occurrence of an accident or a collision in the route section.

One or more additional predefined hazard levels may be provided between the minimum and the maximum hazard level in some embodiments. For example, a hazard level may be provided in which a potential risk has been detected by means of the vehicle guidance system, but it has additionally been detected that there is no immediate threat and the situation is, in particular, manageable.

An additional hazard level may be provided in some embodiments in which a critical situation or an imminent accident or an imminent collision has been detected by means of the electronic vehicle guidance system and it cannot be excluded that the accident or the collision may occur.

A vehicle guidance system may in this case and in the following be understood to mean an electronic system that is configured to guide a motor vehicle in a fully automatic or fully autonomous manner, in particular without a driver having to intervene in a control procedure. In this case, the motor vehicle carries out steering, braking and/or acceleration maneuvers where required by itself and in a fully automatic manner. In some embodiments, the electronic vehicle guidance system is used to implement a fully automatic or fully autonomous driving mode of the motor vehicle as per Level 5 of the SAEJ 3016 classification. An electronic vehicle guidance system may also be understood to mean an advanced driver assistance system (ADAS) which supports a driver during a partially automated or partially autonomous journey of a motor vehicle. In some embodiments, the electronic vehicle guidance system is used to implement a partially automated or partially autonomous driving mode of the motor vehicle as per one of Levels 1 to 4 of the SAEJ 3016 classification.

By means of the analysis unit, the hazard levels may be assigned to a corresponding route section depending on the associated position and the risk characteristic value is determined for the corresponding route section as a function of the hazard levels assigned thereto.

By means of the analysis unit, the hazard levels assigned to the corresponding route section may be statistically evaluated in some embodiments in order to determine the risk characteristic value for the corresponding route section. As a result, the reliability of the corresponding risk characteristic value can be improved.

According to some embodiments, large amounts of hazard-related information from different motor vehicles can be used to determine a risk depending on the route section. The corresponding information may be available to the traffic participants in the form of the risk signal and can be used for individual risk minimization. As a result, the safety of all road traffic is increased.

According to some embodiments, each of the information signals contains accident information, such as if the corresponding hazard situation corresponds to the maximum hazard level. The accident information may for example contain a type and a number of those involved in the accident.

According to some embodiments, each of the information signals contains a point in time, such as a point in time at which the information signal was generated. The relevant risk characteristic value is determined as a time-dependent risk characteristic value for the corresponding route section by means of the analysis unit.

According to some embodiments, the information signals are transmitted to a computing unit of one of the motor vehicles, the computing unit comprising the analysis unit.

The method or analysis steps, which are carried out by the analysis unit, therefore may take place directly in one of the motor vehicles of the large number of motor vehicles. For example, each motor vehicle of the large number of motor vehicles comprises a corresponding analysis unit in order to carry out the relevant steps as described.

In some embodiments, the motor vehicle, which comprises the analysis unit, or a user of said motor vehicle may be one of the traffic participants.

According to some embodiments, the information signals are transmitted to a computing unit of an infrastructure apparatus, the computing unit comprising the analysis unit.

The infrastructure apparatus may for example equate to a server, a back end server, a traffic light or signal system, or a computer system of an authority.

This makes it possible to evaluate and analyze the information signals in a centralized manner. Accordingly, a centralized and large-scale provision of the risk signals may be achieved.

According to some embodiments, a safety measure is initiated by means of a control unit of the at least one traffic participant depending on the risk signal.

According to some embodiments, the at least one traffic participant includes a target motor vehicle. A braking system of the target motor vehicle is preconditioned by means of a control unit of the target motor vehicle depending on the risk signal.

The preconditioning may for example equate to the safety measure or may be part of the safety measure.

The target motor vehicle may in some embodiments be one of the motor vehicles of the large number of motor vehicles or may be another motor vehicle.

The preconditioning may in some embodiments involve building up or increasing a braking pressure of a braking system of the target motor vehicle. The preconditioning may also and in some embodiments involve allocating the braking action or adapting the braking action allocation, for example switching over to a conventional brake, for example in a motor vehicle that can be driven partially or completely by means of electricity.

By preconditioning the braking system, in the event of a critical situation for the target motor vehicle, a corresponding reaction can be sped up by means of a driver of the target motor vehicle or an electronic vehicle guidance apparatus of the target motor vehicle.

According to some embodiments, the at least one traffic participant includes the target motor vehicle. By means of the control unit of the target motor vehicle, a speed of the target motor vehicle is reduced and/or a safe distance of the target motor vehicle is increased depending on the risk signal.

The control unit of the target motor vehicle may for example be a component of the electronic vehicle guidance system of the target motor vehicle.

The safe distance may for example be an actual distance between the target motor vehicle and another motor vehicle driving in front thereof. However, the safe distance may also be a predefined value, in particular a minimum value, for a distance control procedure, for example an automatic distance control procedure by means of an ACC system.

The reduction of the speed or the increase of the safe distance may equate to the safety measure or be part of the safety measure.

The reduction of the speed and/or the increase of the safe distance may also be provided in combination with the preconditioning of the braking system.

By reducing the speed and/or increasing the safe distance, a risk of an accident or the risk that a critical situation occurs is reduced.

According to some embodiments, a sunroof or a window of the target motor vehicle is closed by means of the control unit of the target motor vehicle depending on the risk signal.

According to some embodiments, a warning message is generated and issued to a driver of the target motor vehicle by means of the control unit of the target motor vehicle depending on the risk signal.

According to some embodiments, the at least one traffic participant includes the target motor vehicle. A route plan for the target motor vehicle is adapted by means of a navigation system of the target motor vehicle depending on the risk signal.

The adaptation of the route plan may equate to the safety measure or be part of the safety measure.

By adapting the route plan, for example route sections with a relatively high risk of an accident or route sections in which an accident has occurred can be avoided or bypassed.

According to another independent and exemplary aspect, a system is presented for reducing risks in road traffic. The system comprises a communication interface, which is configured to receive at least one information signal from at least one motor vehicle and to transmit said information signal to an analysis unit of the system. The at least one information signal contains a position of the corresponding motor vehicle and an associated hazard level. The analysis unit is configured to assign the position to one of a plurality of route sections and to determine a risk characteristic value for the route section as a function of the hazard level. The analysis unit is configured to generate a risk signal based on the risk characteristic value. The communication interface is configured to transmit the risk signal to at least one traffic participant.

Other embodiments of the system for reducing risks follow directly from the various embodiments of the method for reducing risks according to first independent exemplary aspect, and vice versa. For example, the system for reducing risks may be configured or programmed to carry out a method as discussed in the preceding with respect to the first independent exemplary aspect and its embodiments.

According to another independent and exemplary aspect, a computer program having commands is presented. When the computer program is executed by means of a system for reducing risks as discussed, in particular when executed by means of the analysis unit of the system, the commands prompt the system to carry out a method for reducing risks according to the improved concept.

According to another independent and exemplary aspect, a computer-readable storage medium is presented on which a computer program as discussed is saved.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the figures may be purposely distorted to make certain features or relationships easier to understand.

In the exemplary embodiments, the described components of the embodiments each represent individual features that should be considered independent of each other and should therefore be considered as a part of the invention both individually and in another combination other than that shown. In addition, the described embodiments can also be supplemented by other features of the invention than those already described.

FIG. 1 shows a schematic representation of an exemplary embodiment of a method according to the improved concept. Moreover, FIG. 1 shows a schematic representation of an exemplary embodiment of a system according to the improved concept. The system 19 comprises a communication interface 20, which, in the embodiment shown in FIG. 1, is arranged in a motor vehicle 5, for example in a control device of the motor vehicle 5, for example a computing unit 8 of the motor vehicle 5. In the example in FIG. 1, the computing unit 8 constitutes an analysis unit 18 of the system 19.

FIG. 1 also shows other motor vehicles 6, 7, which may each comprise an associated computing unit 9, 10. Moreover, FIG. 1 shows infrastructure apparatuses 13, 14, it being possible for the infrastructure apparatus 13 to be designed as a traffic light or signal system and the infrastructure apparatus 14 to be designed, for example, as a computer system of an authority, for example a road traffic authority.

The communication interface 20 is configured to obtain or receive signals from the other motor vehicles 6, 7 and to transmit said signals to the analysis unit 18. Furthermore, the communication interface 20 is configured to receive signals from the analysis unit 18 and to transmit said signals to the infrastructure apparatuses 13, 14 and/or to the other motor vehicles 6, 7.

Reference signs 1 to 4 denote method steps of the method for reducing risks according to the improved concept.

In step 1, the motor vehicles 5, 6, 7 each generate information signals 11, 12 and transmit same to the analysis unit 18. For example, the information signal 11, which is generated and transmitted by the motor vehicle 6, contains the position of the motor vehicle 6 and the information signal 12, which is generated and transmitted by the motor vehicle 7, contains the position of the motor vehicle 7. Another information signal (not shown) is generated by the motor vehicle 5 and transmitted to the analysis unit 18 and contains the position of the motor vehicle 5. In addition to the positions of the motor vehicles 5, 6, 7, the information signals 11, 12 and the information signal not shown here of the motor vehicle 5 contain a relevant associated hazard level. The hazard level may correspond to one of a plurality of predefined hazard levels, it being possible to predefine any desired number of hazard levels and to subdivide them in any desired manner.

In particular, the hazard level may be a current hazard level which a sensor system or electronic vehicle guidance system or driver assistance system of the relevant motor vehicle 5, 6, 7 has identified locally, i.e. in the surroundings of the relevant motor vehicle 5, 6, 7, at the point in time at which the signal was generated.

By way of example, four hazard levels may be predefined. A first hazard level may for example correspond to a situation in which no hazard has been detected by the installed systems of the relevant motor vehicle 5, 6, 7. A second hazard level may for example correspond to a situation in which a hazard or a potentially critical situation has been detected by the installed systems of the relevant motor vehicle 5, 6, 7, but the situation is very likely manageable and the probability of an accident is low or an accident can be excluded. A third hazard level may for example correspond to a situation in which the installed systems of the relevant motor vehicle 5, 6, 7 have detected a hazard or a critical situation and the situation is likely manageable, for example as by means of manual and/or automatic intervention, but an accident cannot be excluded with sufficient probability. A fourth hazard level may for example correspond to a situation in which the installed systems of the relevant motor vehicle 5, 6, 7 have detected that an accident has occurred.

In step 2 of the method, the analysis unit 18 assigns each of the positions of the motor vehicles 5, 6, 7, which were transmitted by means of the information signals 11, 12, to one of a plurality of route sections within a route or road network.

The steps described here in relation to the motor vehicles 5, 6, 7 may in particular be carried out over a longer period of time and/or with regard to other motor vehicles not shown here, such that a statistically evaluable amount of hazard levels and associated position information and, if applicable, corresponding points in time are available in order to be analyzed by means of the analysis unit 18.

In step 2, too, the analysis unit 18 statistically evaluates the data available, in particular the hazard levels for the individual route sections and, based on the statistical evaluation, determines a risk characteristic value for each of the corresponding route sections for which a sufficient amount of data is available. The risk characteristic value may for example represent a traffic risk or risk of an accident for the corresponding route section. The risk characteristic value may in particular also be determined in a time-dependent manner, such that, by way of example, different risk characteristic values can be determined for the same route section for different times or periods of time. For example, risk characteristic values may be determined for times of commuter traffic, holiday periods, different seasons and/or day and nighttime.

In step 3 of the method, the analysis unit 18 generates a risk signal 15 based on the risk characteristic values and provides said signal to one or a plurality of traffic participants, in particular in a predefined environment or within a predefined effective range around the motor vehicle 5. For example, the information signal 15 can be selectively provided to the traffic participants which are located on or in the vicinity of a relevant route section for which the risk characteristic value was determined. In particular, the traffic participants may be the infrastructure apparatuses 13, 14. The traffic participants may also include the motor vehicles 6, 7 and/or other motor vehicles not shown here.

In FIG. 1, the risk signals for all traffic participants 6, 7, 13, 14 are denoted by the reference sign 15. Nevertheless, respective contents of the risk signals 15 may differ for different traffic participants, for example depending on the type or position thereof. Alternatively or additionally, the risk signals that are transmitted may be the same for all traffic participants, but they may be processed or taken into consideration differently thereby.

In step 4 of the method, the traffic participants 6, 7, 13, 14 use the risk signal for example to initiate measures that promote safety or minimize risks, to issue warnings, or to adapt route plans.

For example, respective navigation systems of the motor vehicles 6, 7 may take the risk signal 15 into consideration in order to create or adapt a route plan. As a result, risky route sections can be avoided.

Alternatively or additionally, the computing units 9, 10 of the motor vehicles 6, 7 may issue warning messages for the vehicle occupants thereof, for example visual, haptic and/or audible warning signals.

Alternatively or additionally, respective driver assistance systems of the motor vehicles 6, 7 may be triggered by means of the respective computing units 9, 10 to initiate measures that promote safety or minimize risks. This may include preconditioning of a braking system of the motor vehicles 6, 7, closing windows or a sunroof, preventively tightening seat belts or adapting the mode of driving or driving parameters, for example an automatically regulated speed or an automatically regulated safe distance.

The infrastructure apparatuses 13, 14 may also initiate preventive or risk-minimizing measures depending on the risk signal 15. For example, a traffic light system may control corresponding light signals depending on the risk signal 15 such that a traffic density is reduced in risky route sections or in route sections in which an accident has occurred.

In FIG. 1, the motor vehicle 5 comprises the analysis unit 18 and the corresponding calculation steps and other method steps have been described with reference to the motor vehicle 5. Additionally or alternatively, the motor vehicles 6, 7 or the computing units 9, 10 thereof may serve as the analysis unit according to the improved concept. In particular, the corresponding calculation steps and the transmission of the risk signals 15 may take place in a plurality of the motor vehicles 5, 6, 7.

Figure 2:
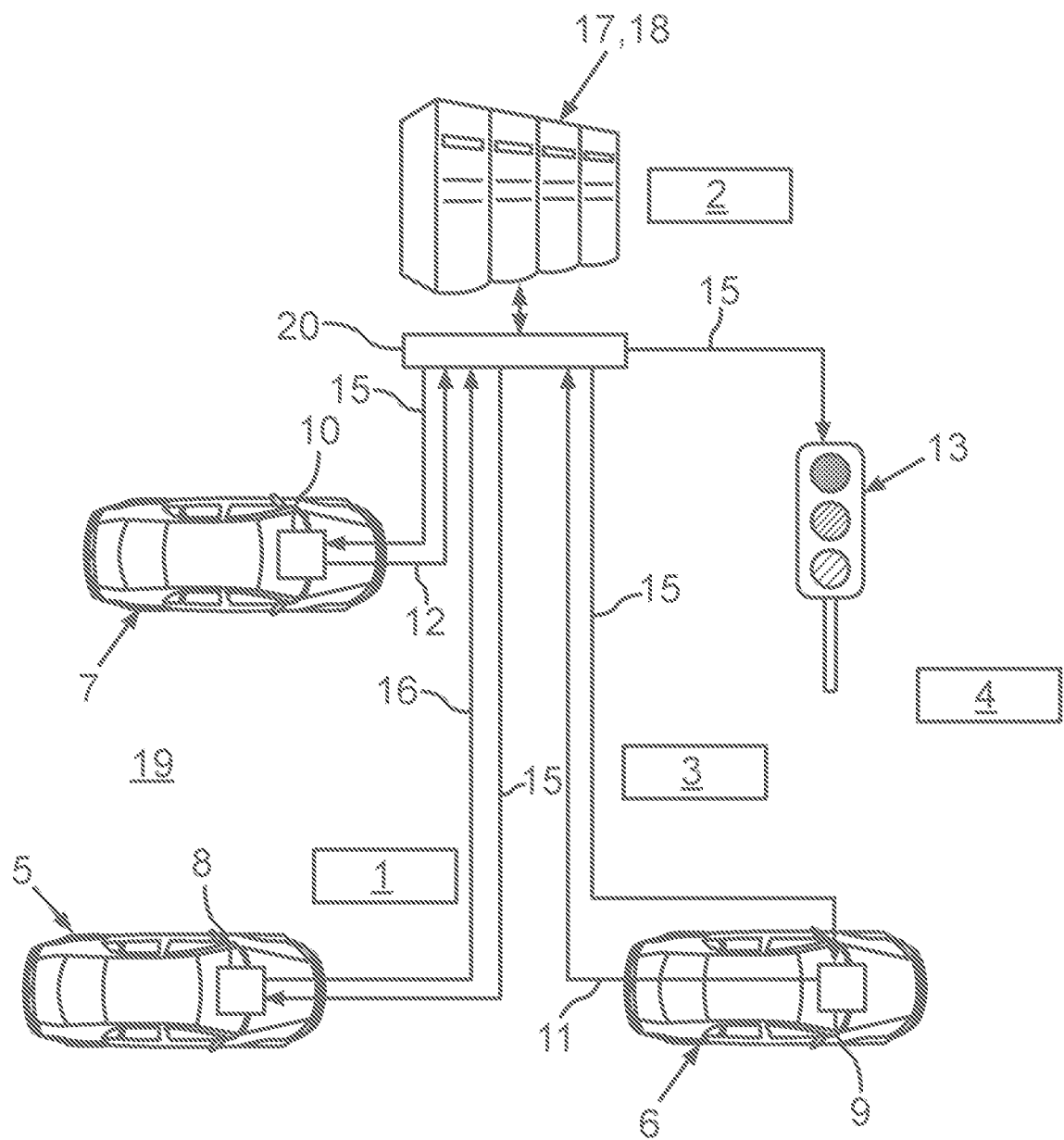
FIG. 2 shows a schematic representation of another exemplary embodiment of a method for reducing risks.

FIG. 2 shows another exemplary embodiment of a method or another exemplary representation of a system 19 according to the improved concept.

The system 19 in FIG. 2 differs from the system 19 in FIG. 1 at least in that the analysis unit 18 is designed as a component of a central back end server 17. The back end server 17 accordingly also comprises the communication interface 20. The information signals 11, 12 of the motor vehicles 6, 7 and the information signal 16 of the motor vehicle 5 are accordingly transmitted via the communication interface 20 to the back end server 17 or to the analysis unit 18 in step 1. The steps of the method step 2 described with reference to FIG. 1 are carried out in a system 19 according to FIG. 2 by means of the analysis unit 18 of the back end server 17.

Instead of a decentralized calculation and allocation of the risk characteristic values or risk signals 15, according to FIG. 2 this is done centrally in the back end server 17. Apart from that, the method steps and the system components of the system 19 and the functionality thereof correspond to those described with reference to FIG. 1.

The improved concept exploits the fact that motor vehicles in road traffic often have driver assistance systems that can reliably detect the traffic situation or risk situation. The driver assistance systems may detect and/or assess method situations and if necessary perform automatic reactions in order to prevent hazards or accidents or to minimize the consequences of an accident. The local information, i.e. the information in each individual motor vehicle, is used according to the improved concept to predictively assess the hazards for other motor vehicles and traffic participants as well.

Motor vehicles equipped with driver assistance systems thus collect information, for example, from a plurality of traffic participants. This includes safety-related data on the traffic situation and all detected and/or corroborated hazards on a corresponding route section as well as, for example, points in time at which the data are collected. By means of the analysis unit, an assessed risk for a route section that may for example be resolved in a time-dependent manner is generated in the form of the risk signal. The information from the risk signal of a specific route section may be used for route planning and for warning the driver, another traffic participant or a system of the motor vehicle at an early stage. As a result, measures that promote safety and minimize risks can be initiated.

LIST OF REFERENCE NUMBERS

1, 2, 3, 4 Method steps
5, 6, 7 Motor vehicles
8, 9, 10 Computing units
11, 12 Information signals
13, 14 Infrastructure apparatuses
15 Risk signal
16 Information signal
17 Back end server
18 Analysis unit
19 System
20 Communication interface The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for reducing risks in road traffic, wherein
    using each of two or more motor vehicles, generating and transmitting an information signal to an analysis unit; wherein each information signal contains an absolute position of the corresponding motor vehicle and an associated hazard level;
    using the analysis unit, assigning each absolute position to one of a plurality of route sections and determining a risk characteristic value for each of the route sections as a function of the hazard level;
    using the analysis unit, generating a risk signal based on at least one risk characteristic value and providing the risk signal to at least one traffic participant; wherein the hazard level is assigned to a corresponding route section depending on the associated position, and the risk characteristic value is determined for the corresponding route section as a function of the hazard level assigned thereto; and using the analysis unit, statistically evaluating the hazard level assigned to the corresponding route section in order to determine the risk characteristic value for the corresponding route section.

2. The method of claim 1, wherein the hazard level is selected from a plurality of predefined hazard levels.

3. The method of claim 2, wherein the predefined hazard levels comprise one or more of a minimum hazard level which corresponds to a situation in which an electronic vehicle guidance system of a motor vehicle has detected no hazard, and a maximum hazard level, which corresponds to a situation in which the electronic vehicle guidance system of the motor vehicle has detected an occurrence of an accident or a collision in the route section.

4. The method of claim 3, wherein
the predefined hazard levels comprise the minimum hazard level and the maximum hazard level; and
one or more additional predefined hazard levels are provided between the minimum and maximum hazard level, one additional hazard level being provided in which a critical situation or an imminent accident or an imminent collision has been detected using the electronic vehicle guidance system, in which the imminent accident or the imminent collision may potentially occur.

5. The method of claim 4, wherein the information signal is transmitted to a computer of an infrastructure apparatus, wherein computer of the infrastructure apparatus comprises the analysis unit.

6. The method of claim 4, wherein the information signal is transmitted to a computer of one of the motor vehicles, wherein the computer comprising the analysis unit.

7. The method of claim 4, further comprising initiating a safety measure using a processor of the at least one traffic participant depending on the risk signal.

8. The method of claim 3, wherein the information signal is transmitted to a computer of an infrastructure apparatus, wherein the computer of the infrastructure apparatus comprises the analysis unit.

9. The method of claim 3, wherein the information signal is transmitted to a computer of one of the motor vehicles, wherein the computer comprising the analysis unit.

10. The method of claim 3, further comprising initiating a safety measure using a processor of the at least one traffic participant depending on the risk signal.

11. The method of claim 2, wherein the information signal is transmitted to a computer of an infrastructure apparatus, wherein the computer of the infrastructure apparatus comprises the analysis unit.

12. The method of claim 2, wherein the information signal is transmitted to a computer of one of the motor vehicles, wherein the computer comprising the analysis unit.

13. The method of claim 2, further comprising initiating a safety measure using a processor of the at least one traffic participant depending on the risk signal.

14. The method of claim 1, wherein the information signal is transmitted to a computer of one of the motor vehicles, wherein the computer comprising the analysis unit.

15. The method of claim 1, further comprising initiating a safety measure using a processor of the at least one traffic participant depending on the risk signal.

16. The method of claim 1, wherein
the at least one traffic participant comprises a target motor vehicle; and
a braking system of the target motor vehicle is preconditioned using a processor of the target motor vehicle depending on the risk signal.

17. The method of claim 1, wherein
the at least one traffic participant comprises a target motor vehicle; and
using a processor of the target motor vehicle, one or more of a speed of the target motor vehicle is reduced and a safe distance of the target motor vehicle is increased depending on the risk signal.

18. The method of claim 1, wherein
the at least one traffic participant comprises a target motor vehicle; and
a route plan for the target motor vehicle is adapted using a navigation system of the target motor vehicle depending on the risk signal.

19. The method of claim 1, wherein the information signal is transmitted to a computer of an infrastructure apparatus, wherein the computer of the infrastructure apparatus comprises the analysis unit.

20. A system for reducing risks in road traffic, wherein
the system comprises a communication interface, which is configured to receive at least one information signal from two or more motor vehicles and to transmit said at least one information signal to an analysis unit of the system;
said at least one information signal comprises an absolute position of the corresponding motor vehicle and an associated hazard level;
the analysis unit is configured:
to assign the absolute position to one of a plurality of route sections and to determine a risk characteristic value for each of the route sections as a function of the hazard level; and
to generate a risk signal based on the risk characteristic value;
the communication interface is configured to transmit the risk signal to at least one traffic participant; and
the analysis unit is configured:
to assign the hazard level to a corresponding route section depending on the associated position;
to determine the risk characteristic value for the corresponding route section as a function of the hazard level assigned thereto; and
to statistically evaluate the hazard level assigned to the corresponding route section in order to determine the risk characteristic value for the corresponding route section.

* * * * *